US007980572B2

(12) United States Patent
Bennett

(10) Patent No.: US 7,980,572 B2
(45) Date of Patent: Jul. 19, 2011

(54) MOBILITY DEVICE FOR AMPUTEE AND LEG-INJURED PERSONS

(76) Inventor: Becky J. Bennett, Muskegon, MI (US)

( * ) Notice: Subject to any disclaimer, the term of this patent is extended or adjusted under 35 U.S.C. 154(b) by 76 days.

(21) Appl. No.: 12/498,727

(22) Filed: Jul. 7, 2009

(65) Prior Publication Data

US 2010/0007104 A1 Jan. 14, 2010

Related U.S. Application Data

(60) Provisional application No. 61/079,193, filed on Jul. 9, 2008.

(51) Int. Cl.
*B62M 1/12* (2006.01)

(52) U.S. Cl. .................. 280/87.021; 280/400; 280/426; 280/47.19

(58) Field of Classification Search ............ 280/87.021, 280/87.041, 87.05, 47.11, 87.043, 30, 304.1, 280/657, 638, 400, 418, 426, 491.1, 33.996, 280/1.202, 1.203, 79.2, 79.5, 35, 47.19, 47.24, 280/47.26, 47.34, 47.35, 47.38, 47.4
See application file for complete search history.

(56) References Cited

U.S. PATENT DOCUMENTS

| | | | | |
|---|---|---|---|---|
| 933,794 | A * | 9/1909 | Sprung | 280/483 |
| 1,917,440 | A * | 7/1933 | Finkbeiner et al. | 297/6 |
| 2,168,424 | A * | 8/1939 | Skinner et al. | 297/6 |
| 2,244,869 | A * | 6/1941 | Everest et al. | 135/68 |
| 2,433,959 | A | 1/1948 | Wood | |
| 2,433,969 | A * | 1/1948 | Wood | 297/6 |
| 2,652,097 | A | 9/1953 | Warren | |
| 2,776,701 | A * | 1/1957 | Denis | 297/6 |
| 3,044,797 | A * | 7/1962 | Borland | 280/87.051 |
| 3,074,420 | A * | 1/1963 | Gottman | 135/69 |
| 3,129,952 | A * | 4/1964 | Rivers | 280/87.051 |
| 3,294,035 | A * | 12/1966 | Enochian | 410/65 |
| 3,377,085 | A * | 4/1968 | Fralick | 280/408 |
| 3,434,558 | A * | 3/1969 | Allen | 180/208 |
| 3,513,924 | A * | 5/1970 | Jackson | 180/14.1 |
| 3,575,250 | A * | 4/1971 | Dykes | 180/11 |
| 3,596,668 | A | 8/1971 | Tosto | |
| 3,605,929 | A * | 9/1971 | Rolland | 180/208 |
| 3,633,967 | A | 1/1972 | Timmins | |

(Continued)

OTHER PUBLICATIONS

Weil Knee Walker, shown at www.kneewalker.net website dated Jul. 7, 2009.

(Continued)

*Primary Examiner* — Jeffrey J Restifo
*Assistant Examiner* — Brodie Follman
(74) *Attorney, Agent, or Firm* — Price, Heneveld, Cooper, DeWitt, & Litton LLP

(57) ABSTRACT

An amputee mobility device includes a wheeled frame, and seat with webbed pocket for receiving an amputated leg. The seat is adjustable height adjustable, as is the pocket for customizing to individuals. Adjustable handles allow amputees to move themselves, or allow a helper to push like a wheelchair. In one form, the frame includes front and rear articulated subframes. In another form, the wheeled frame forms an elongated rigid frame, with two fixed-axle wheels and two rear-located steerable wheels and one front-located steerable wheel. In another form, the frame includes two fixed-axle wheels and two steerable wheels arranged to function somewhat like a wheeled walking cane. Optional features include outriggers for leg protection, a foldable frame for compact storage and shipment, bicycle-like lockable hand brakes, a seat without aperture for supporting a lower leg extending horizontally, storage shelves, and cup holders.

29 Claims, 16 Drawing Sheets

U.S. PATENT DOCUMENTS

| | | | | | |
|---|---|---|---|---|---|
| 3,807,760 | A * | 4/1974 | Jordan | 280/218 |
| 3,863,950 | A * | 2/1975 | Jordan | 280/218 |
| 3,949,999 | A * | 4/1976 | Breslow | 280/827 |
| 4,141,375 | A * | 2/1979 | Tykwinski | 135/66 |
| 4,200,304 | A * | 4/1980 | Hwang | 280/218 |
| 4,291,715 | A * | 9/1981 | Monte | 135/68 |
| 4,487,006 | A * | 12/1984 | Scag | 56/14.7 |
| 4,722,356 | A * | 2/1988 | Rehder | 135/67 |
| 4,761,013 | A * | 8/1988 | Dowton | 280/87.021 |
| 4,771,840 | A * | 9/1988 | Keller | 180/11 |
| 4,867,188 | A * | 9/1989 | Reid | 135/67 |
| 4,890,684 | A * | 1/1990 | Simmons | 180/419 |
| 4,924,894 | A * | 5/1990 | Martinez | 135/65 |
| 4,934,725 | A * | 6/1990 | Owens | 280/304.1 |
| 4,969,656 | A * | 11/1990 | Clausen | 280/47.38 |
| 5,088,751 | A * | 2/1992 | Zint | 280/47.34 |
| 5,255,697 | A * | 10/1993 | Grauer | 135/67 |
| 5,280,937 | A * | 1/1994 | Needham | 280/259 |
| 5,300,016 | A * | 4/1994 | Marlatt | 602/16 |
| 5,364,120 | A * | 11/1994 | Shimansky | 280/650 |
| 5,378,215 | A * | 1/1995 | Harkins | 482/67 |
| 5,411,035 | A | 5/1995 | Stone | |
| 5,439,069 | A * | 8/1995 | Beeler | 180/11 |
| 5,522,782 | A * | 6/1996 | Kurtin et al. | 482/66 |
| 5,562,166 | A * | 10/1996 | Griffin | 172/42 |
| 5,564,721 | A * | 10/1996 | Wians | 280/32.7 |
| 5,597,148 | A * | 1/1997 | Gospodarich | 248/311.2 |
| 5,704,625 | A * | 1/1998 | Presnell et al. | 280/79.2 |
| 5,711,334 | A * | 1/1998 | Roux | 135/65 |
| 5,718,534 | A * | 2/1998 | Neuling | 404/94 |
| 5,746,236 | A * | 5/1998 | Tilsley et al. | 135/66 |
| 5,794,957 | A * | 8/1998 | Mendon | 280/204 |
| 5,800,317 | A * | 9/1998 | Accetta | 482/66 |
| 5,839,740 | A * | 11/1998 | Seeger | 280/87.021 |
| 5,860,659 | A * | 1/1999 | Hart | 280/79.5 |
| 5,937,440 | A * | 8/1999 | Ferriter | 2/24 |
| 5,944,338 | A * | 8/1999 | Simpson | 280/650 |
| 6,053,189 | A | 4/2000 | Longenecker et al. | |
| 6,149,170 | A * | 11/2000 | Dotson | 280/87.021 |
| 6,161,860 | A * | 12/2000 | Corneau | 280/642 |
| 6,219,845 | B1 * | 4/2001 | Ferriter | 2/24 |
| 6,296,263 | B1 | 10/2001 | Schultz et al. | |
| 6,367,824 | B1 * | 4/2002 | Hayashi | 280/62 |
| 6,386,304 | B1 * | 5/2002 | Wang | 180/65.1 |
| 6,431,566 | B1 * | 8/2002 | Gu | 280/87.021 |
| 6,494,470 | B2 * | 12/2002 | Chang | 280/87.041 |
| 6,626,446 | B1 * | 9/2003 | Yosef | 280/47.38 |
| 6,634,660 | B2 * | 10/2003 | Miller | 280/87.021 |
| 6,647,825 | B1 * | 11/2003 | Lin | 74/502.2 |
| 6,712,167 | B2 * | 3/2004 | Gu | 180/205 |
| 6,799,592 | B1 * | 10/2004 | Reynolds | 135/74 |
| 6,848,696 | B2 * | 2/2005 | Miller | 280/87.021 |
| 6,874,587 | B2 * | 4/2005 | Wang | 180/65.1 |
| 6,886,494 | B2 * | 5/2005 | Labrecque et al. | 119/453 |
| 6,959,716 | B1 * | 11/2005 | Schrader | 135/66 |
| 7,108,004 | B2 * | 9/2006 | Cowie et al. | 135/74 |
| 7,111,856 | B1 * | 9/2006 | Graham | 280/87.021 |
| 7,287,767 | B1 * | 10/2007 | Gomes et al. | 280/87.021 |
| 7,293,827 | B2 | 11/2007 | Schrader | |
| 7,311,319 | B1 * | 12/2007 | Ortega | 280/87.05 |
| D589,410 | S * | 3/2009 | Ramm et al. | D12/130 |
| 7,600,524 | B2 * | 10/2009 | West | 135/71 |
| D618,140 | S * | 6/2010 | Sanderson et al. | D12/130 |
| 7,780,180 | B2 * | 8/2010 | Hoepner et al. | 280/267 |
| 2002/0024196 | A1 * | 2/2002 | Malassigne et al. | 280/648 |
| 2002/0089136 | A1 * | 7/2002 | Gu | 280/87.021 |
| 2002/0130482 | A1 * | 9/2002 | Jang | 280/244 |
| 2003/0094779 | A1 * | 5/2003 | Miller | 280/87.021 |
| 2004/0012165 | A1 * | 1/2004 | Miller | 280/87.01 |
| 2004/0182327 | A1 * | 9/2004 | Labrecque et al. | 119/452 |
| 2004/0201192 | A1 * | 10/2004 | Ramm | 280/87.021 |
| 2007/0044826 | A1 * | 3/2007 | Schrader | 135/66 |
| 2007/0182116 | A1 * | 8/2007 | Davey et al. | 280/87.05 |
| 2008/0042404 | A1 * | 2/2008 | Mariani et al. | 280/657 |
| 2008/0054582 | A1 * | 3/2008 | Thibault | 280/47.35 |
| 2008/0110483 | A1 * | 5/2008 | Herba et al. | 135/67 |
| 2008/0135077 | A1 * | 6/2008 | Meyers et al. | 135/66 |
| 2009/0266833 | A1 * | 10/2009 | Savage et al. | 220/757 |
| 2010/0007104 | A1 * | 1/2010 | Bennett | 280/7.15 |
| 2010/0032925 | A1 * | 2/2010 | Ehrenreich et al. | 280/648 |
| 2010/0294073 | A1 * | 11/2010 | Ehrenreich et al. | 74/502.2 |

OTHER PUBLICATIONS

RollerAid Orthopedic Leg Support Scooter, shown at www.rolleraid.com website dated Jul. 7, 2009.

* cited by examiner

MOBILITY DEVICE FOR AMPUTEE AND LEG-INJURED PERSONS

This application claims benefit under 35 U.S.C. §119(e) of provisional application Ser. No. 61/079,193, filed Jul. 9, 2008, entitled MOBILITY DEVICE FOR AMPUTEE AND LEG-INJURED PERSONS, the entire contents of which are incorporated herein in their entirety.

BACKGROUND

The present invention relates to mobility devices for amputees or individuals with leg, ankle, or foot injuries, and more particularly relates to a wheeled device with an adjustable seat adapted to engage and support an amputated limb of a person, and/or adapted for use as a wheelchair, and/or adapted for use as a walker, and/or adapted for transport of items (such as personal items of the amputee).

Many mobility devices intended for use by amputees are undesirably cumbersome, expensive, and/or surprisingly semi-unstable, especially when used by heavier persons. Further, the devices often have limited (or zero) adjustability, limited (or zero) foldability, and limited (or zero) storage capacity for transporting items along with the amputee. Further, their width is often so great that it is difficult (or not possible) for them to be manipulated around corners, and through door-openings and narrow spaces often found in homes and buildings. Also, many such devices have poor cornering capability, leading to difficulty especially for a novice user.

Some mobility devices are essentially walkers with wheels, where a frame of the walker extends around the front and sides of a user, and where wheels are located at the frame's corners. However, a leg-amputated user must literally hop along in order to use them, supporting their weight during the "hop" on the wheeled device. This can create a serious risk of falling due to the instability created when the shifting weight of a large adult user is borne by the wheeled device at waist level, even if the wheels are made to lock or move to a recessed position when bearing weight. Other mobility devices are collapsible in some fashion, but the act of collapsing and/or expanding them requires significant effort and/or help from a third party helper. Some mobility devices have a storage bag or basket, however there is often limited room on the cart and also nothing to prevent the stored items from tipping and/or mixing. Another problem is that existing mobility devices are not adjustable to accommodate people with different body shapes and preferences. Still further, most cannot be adjusted for use by children, but instead require that a separate smaller version of the device be purchased.

Another problem is that known mobility devices have an unattractive appearance. This can (and does) discourage users, both because it reinforces the prejudicial "label" of being an amputee, and further it depresses users mentally by reminding them of their limitations.

I have noticed one particular situation that can cause trouble. Amputees often remove their prosthesis in order to prevent sores from developing. However, when removed, it is difficult for the amputee to get around. Concurrently, it is cumbersome to reattach the prosthesis. Thus, many amputees will try and hop to get around, such as to get to a bathroom or restroom, rather than re-attach the prosthesis or wait for assistance. This can lead to falls and injury.

SUMMARY OF THE PRESENT INVENTION

In one aspect of the present invention, a mobility device includes an articulating frame including front and rear wheeled subframes pivotally connected together for articulated cornering movement, and a cushioned support member adapted to support a user on at least one of the first and second wheeled subframes.

In another aspect of the present invention, a mobility device includes an articulating frame including front and rear wheeled subframes pivotally connected together for articulated cornering movement, a horizontal support member on the front subframe adapted to support a user, and an upright handle on one of the subframes adapted for use by the user and/or by a helper.

In another aspect of the present invention, a mobility device includes a frame having opposing fixed-axle wheels and opposing steerable wheels arranged around four sides of the frame, a horizontal support member on the frame with a pocket adapted to support an amputated leg of a user, and an upright handle on the frame adapted for grasping by the user to facilitate use of the mobility device.

In another aspect of the present invention, an amputee mobility device includes a wheeled frame, and a member supported on the wheeled frame that defines a pocket-like basket suitable for vertically directly receiving an amputee's leg, the wheeled frame and basket being constructed to support an amputee moving across a level surface with a walking motion.

In another aspect of the present invention, an amputee mobility device includes a portable frame, and a member supported on the portable frame that defines a pocket suitable for vertically receiving an amputee's leg, the wheeled frame and basket being constructed to support an amputee moving across a surface.

In alternative forms of the above inventive concepts, the present invention includes such things as an adjustable webbed basket or pocket (size and/or depth adjustable), a cushioned or padded or upholstered seat that supports the webbed basket, a vertically adjustable seat, a seat that is rotatable to at least one second position on the frame or that is easily removable, a seat that forms a wheelchair-simulating arrangement with a portion of the seat extending from the frame, wheels including at least two fixed-axle wheels and at least one steerable wheel (up to three steerable wheels with some being forward and rearward of the fixed-axle wheels), protruding outriggers extending from the frame to protect a user's leg (such as when in wheelchair configuration or when a person with injured knee is using the device), adjustable handles (vertically, rotationally), one or more shelves (e.g., two, with one being vertically adjustable, one having cupholders, one extending from under the seat), a frame that is foldable, and one or more (bicycle-like) hand brakes (lockable or not).

In another aspect of the present invention, a mobility device includes a frame with wheels, at least some of the wheels being steerable so that the frame can be moved in different directions across a floor surface, and an adjustable seat operably supported on the wheeled frame for supporting a user's injured leg, with uprights on the frame extending above the seat and including handles on the uprights shaped for grasping by the user or by a third party helper.

In another aspect of the present invention, a mobility device includes a frame with wheels, at least some of the wheels being steerable so that the frame can be moved in different directions across a floor surface, and a cushioned support member supported on the wheeled frame for supporting a user's injured leg, the frame including outriggers extending horizontally from the cushioned support member and configured to protect the user's injured leg (including foot, ankle, knee or other) while using the mobility device.

In another aspect of the present invention, a mobility device includes a frame with wheels, at least some of the wheels being steerable so that the frame can be moved in different directions across a floor surface, a cushioned seat supported on the wheeled frame for supporting a user's injured or amputated leg, and a shelf on the frame generally under the seat.

The present apparatus is contemplated to be particularly useful in orthopedic and sports medicine, rheumatologists, foot doctors, diabetics, and other individuals with limitations requiring some level of assistance when moving.

These and other aspects, objects, and features of the present invention will be understood and appreciated by those skilled in the art upon studying the following specification, claims, and appended drawings.

BRIEF DESCRIPTION OF DRAWINGS

FIG. 10 is a perspective view of a first modified mobility device having front and rear subframes pivoted together for articulated movement around corners and the like.

DETAILED DESCRIPTION OF PREFERRED EMBODIMENTS

Figure 1:
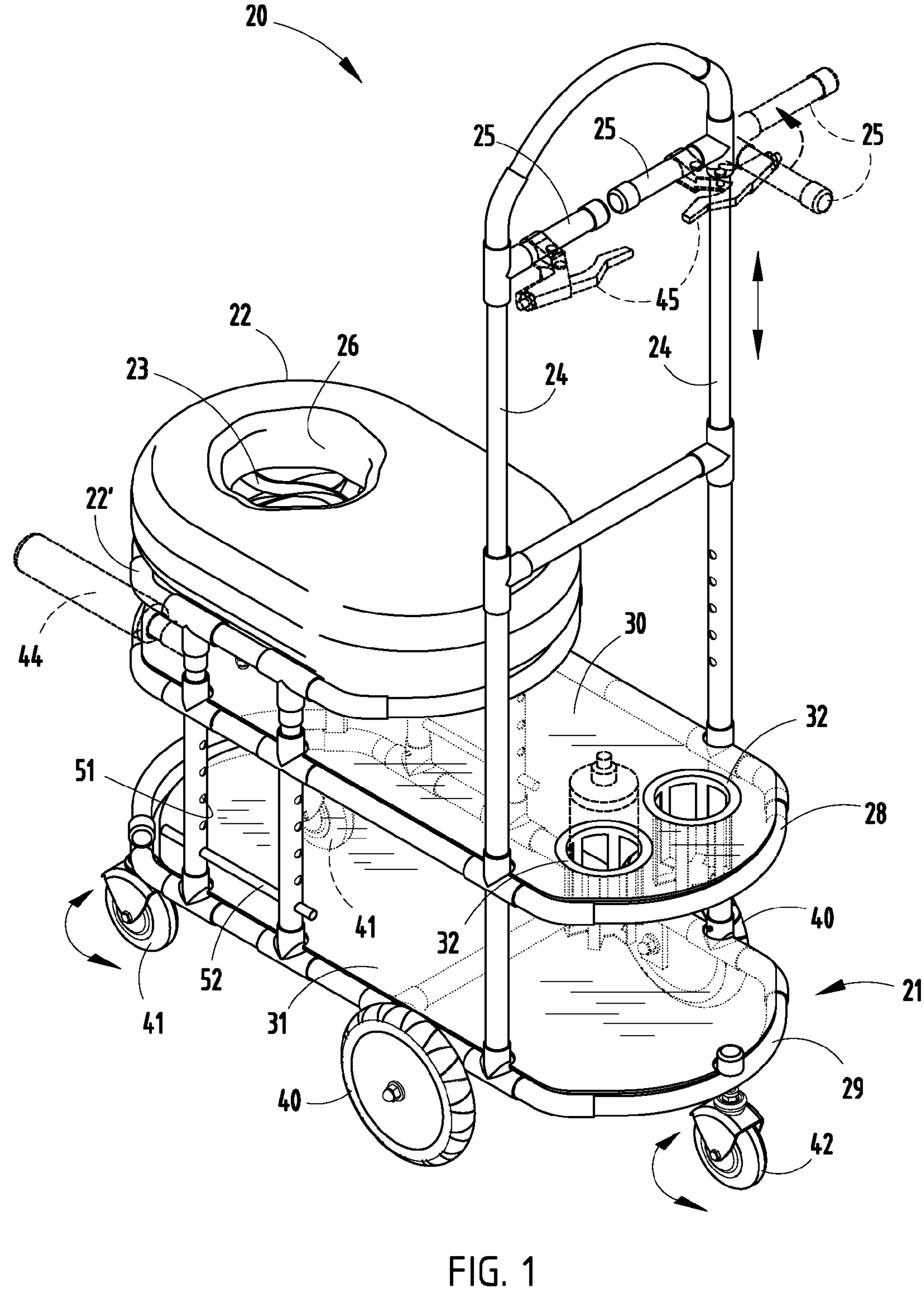
FIGS. 1-1A are front and rear perspective views of the present mobility device.
Figure 1A:
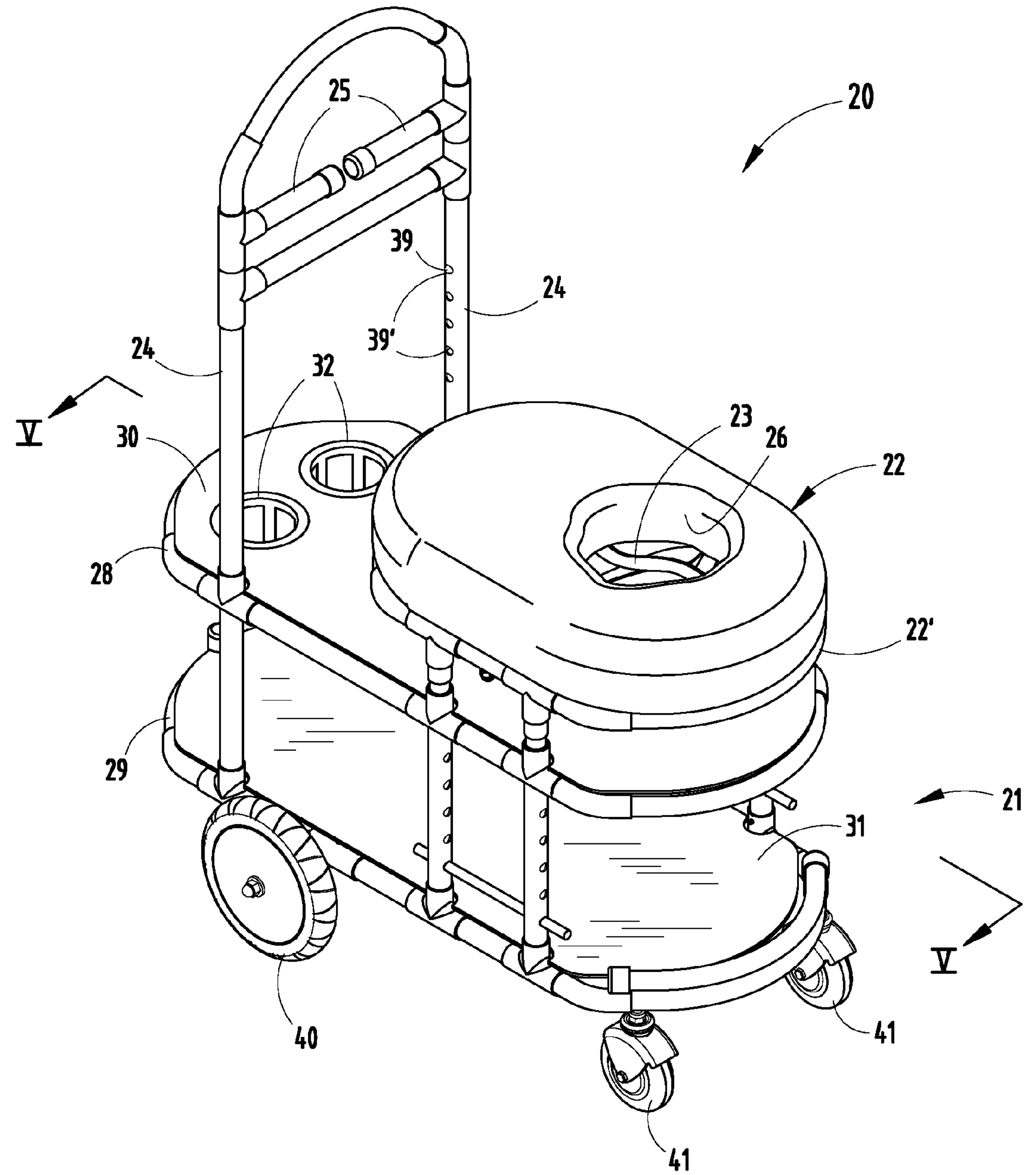
Figure 2:
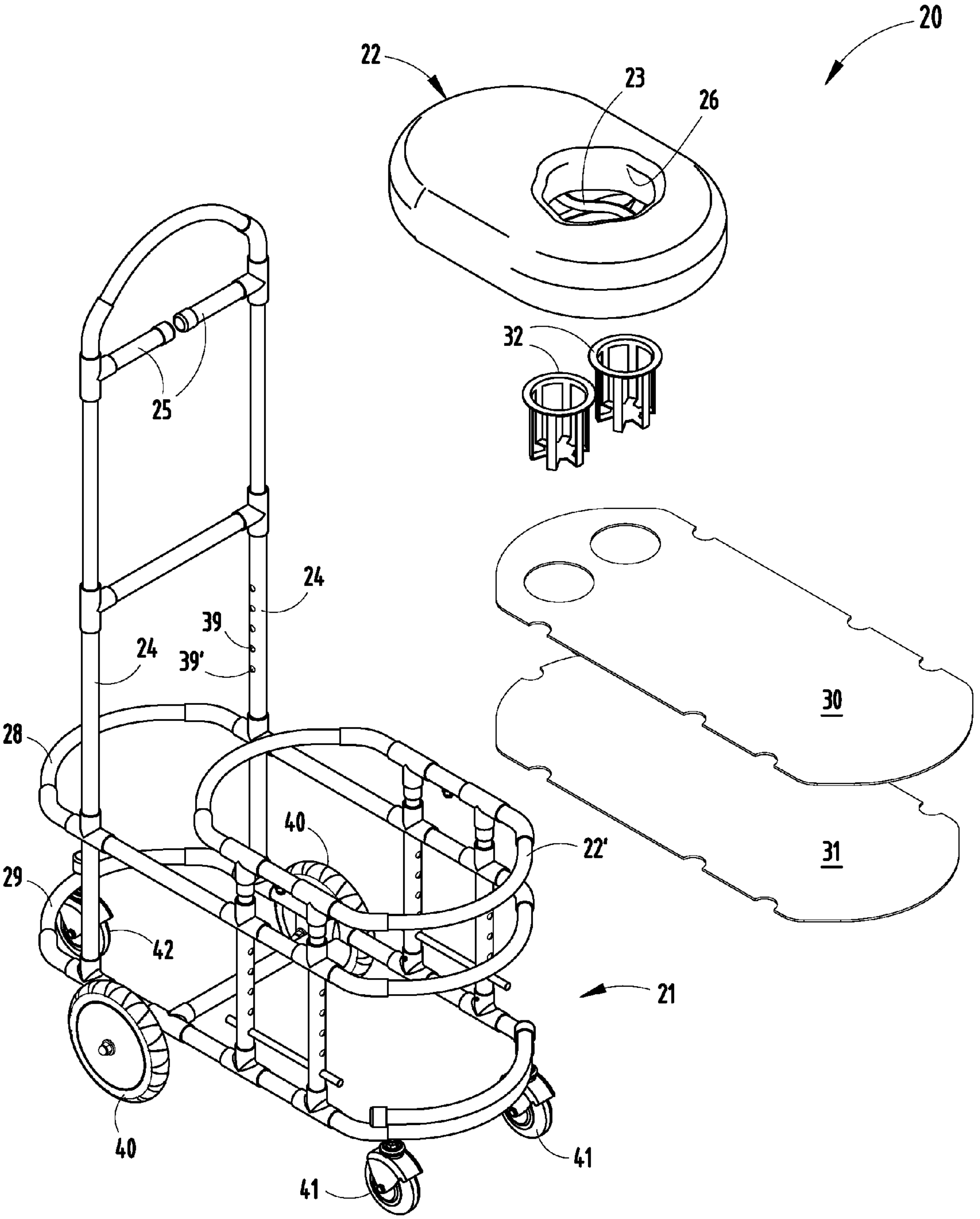
FIG. 2 is an exploded perspective view of the device of FIG. 1.

An amputee mobility device 20 (FIG. 1) includes a wheeled frame 21 (FIGS. 1-2), and apertured seat 22 (also called "cushioned structural member" and "horizontal structural support member") with a pocket 23 (also called "basket") suitable for directly receiving the stump (i.e., amputated leg) of an amputee, such that an amputee can simply place their stump in position and move with stability across a floor. The basket 23 can be custom-made for an individual, such as by molding or sewn fabric, or can be made adjustable such as by using hook-and-loop material (i.e., Velcro®). The present device is particularly useful since, for example, amputees prefer not to struggle to attach a prosthesis when their goal is simply to move a short distance. On the other hand, it is potentially quite unsafe for an amputee with one leg to hop across a room, whether they use an assistance device or not.

The illustrated frame 21 includes upper and lower loop-shaped subframes 28 and 29 supported by telescoping vertical tube sections 21C. Various arrangements are contemplated, but the illustrated vertical tube sections 21C are located near corners of the frame 21 and at a mid-way location near a rear of the seat 22. Dimensions of the frame 21 can be adjusted as desired. The illustrated device 20 for adults is about 15-16" wide×28-34" long×16-28" high (to top of seat). Tubes are about ¾" to ⅞" o.d. aluminum tubing with various "T" and "X" connectors being used for fixed or sliding joindure. It is contemplated that welding and other attachments could be used. The present arrangement is surprisingly light in weight (weighing less than about 25 pounds depending on optional features selected) yet is also surprisingly stable despite its small footprint size due to the frame's strength and the five-wheel design with steerable and fixed-axle wheels.

The frame 21 also includes uprights 24 (also called "upright handles") with telescopingly-engaging tube sections that are vertically telescopingly adjustable to raise and lower handles 25 (also called "hand grips") for different uses. The vertically telescopingly adjustable tubes can be locked in adjusted positions by various means. For example, a detent with finger-depressible spring-biased projections can be placed in one of the mating tube sections for selective engagement with aligned holes in the mating tube section to lock the telescoping tubes in an adjusted position. The handles 25 are rotatably mounted on the uprights 24 for movement between a rear-facing position for grasping and pushing by a helper like a wheelchair, an inward-facing position for storage or use by a user or a helper, and an out-facing position where a person standing beside the device can grip the handle(s) 25.

The seat 22 is mounted on a top portion of the frame 21 and is made to be vertically adjustable by telescoping tubes on the frame, as discussed below. Also, it is contemplated that the seat can be made removable and/or reversible (front-to-rear) so that the aperture 26 in the seat 22 for the pocket/webbed basket 23 is repositioned (e.g., farther rearward). This makes a larger area of the cushioned seat available to support a seated user. It is also contemplated that the seat 22 can be made without a pocket/basket and shaped to support a seated user with their legs extending forward of the device. In such case, forwardly-extending outriggers 44 can be incorporated into the frame 21 on either side of the frame to protect knees, as discussed below. Notably, the illustrated seat 22 is cushioned and upholstered. However, it is contemplated that different seat shapes and sizes can be made, and in particular that a top surface of the seat can be configured with an channel-like undulation or molded-in pocket-shaped depression to optimally and comfortably support the user's leg when using the device 20.

The frame 21 includes upper and lower subframes 28 and 29 that support shelves 30 and 31, respectively, subframe 28 also including upward tube sections that support the seat 22 above upper shelf 30. It is contemplated that the shelves will be made from a material that will not break, crack or chip, such as polycarbonate polymer (e.g., Lexan®) or metal sheet. Clear polymeric plastic materials work particularly well due to their material characteristics and attractive appearance and since they provide visual access that may be important. The illustrated upper shelf 30 includes apertures with cup holders 32 therein. It is contemplated that the shelves 30 and/or 31 can include other functional structures as desired, such as a lockable or (non-lockable) container with sides. Notably, when the seat 22 is raised, additional storage space and access is provided to a top of shelves 30 and 31.

Figure 3A:
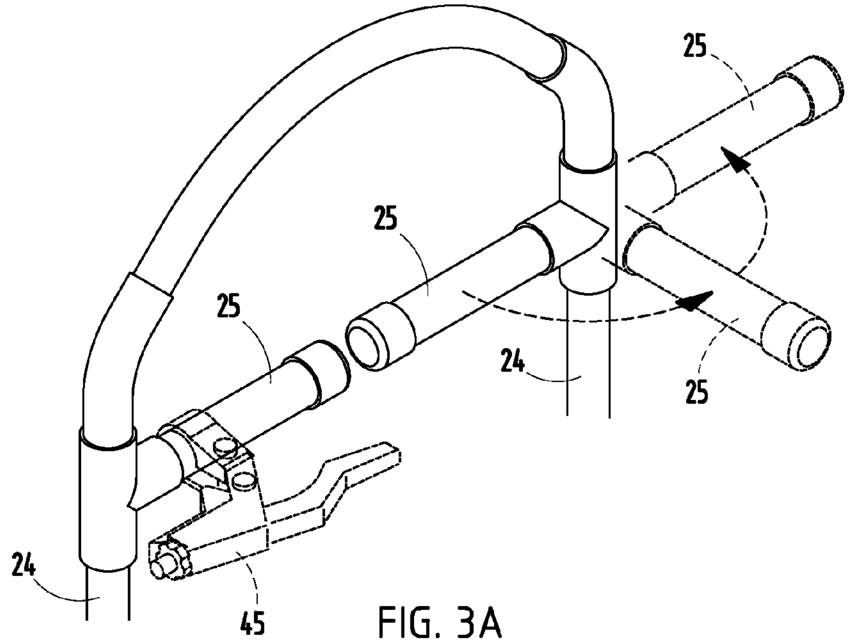
FIG. 3A is an enlarged perspective view of the upright and handles of FIG. 1.
Figure 3B:
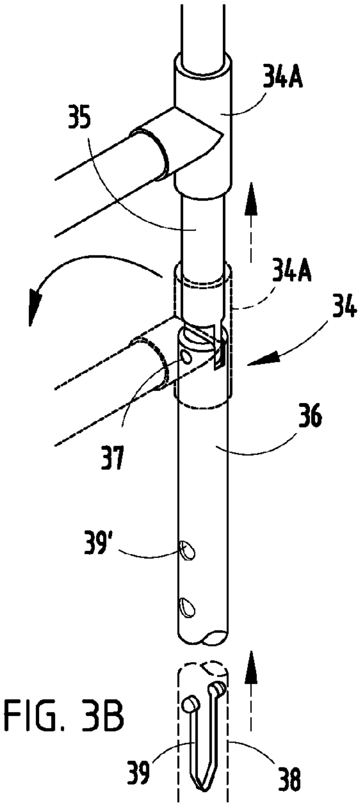
FIGS. 3B-3C are fragmentary perspective views of a foldable joint on the upright of FIG. 1.
Figure 3C:
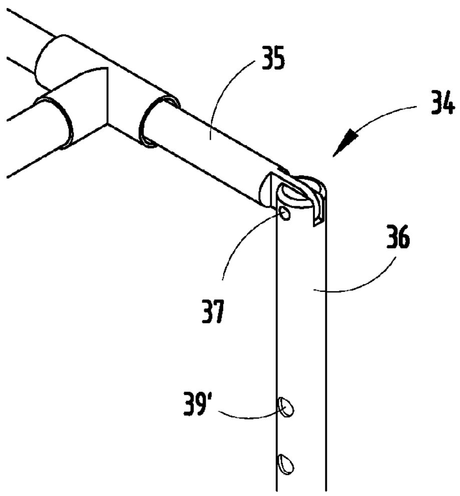
Figure 4:
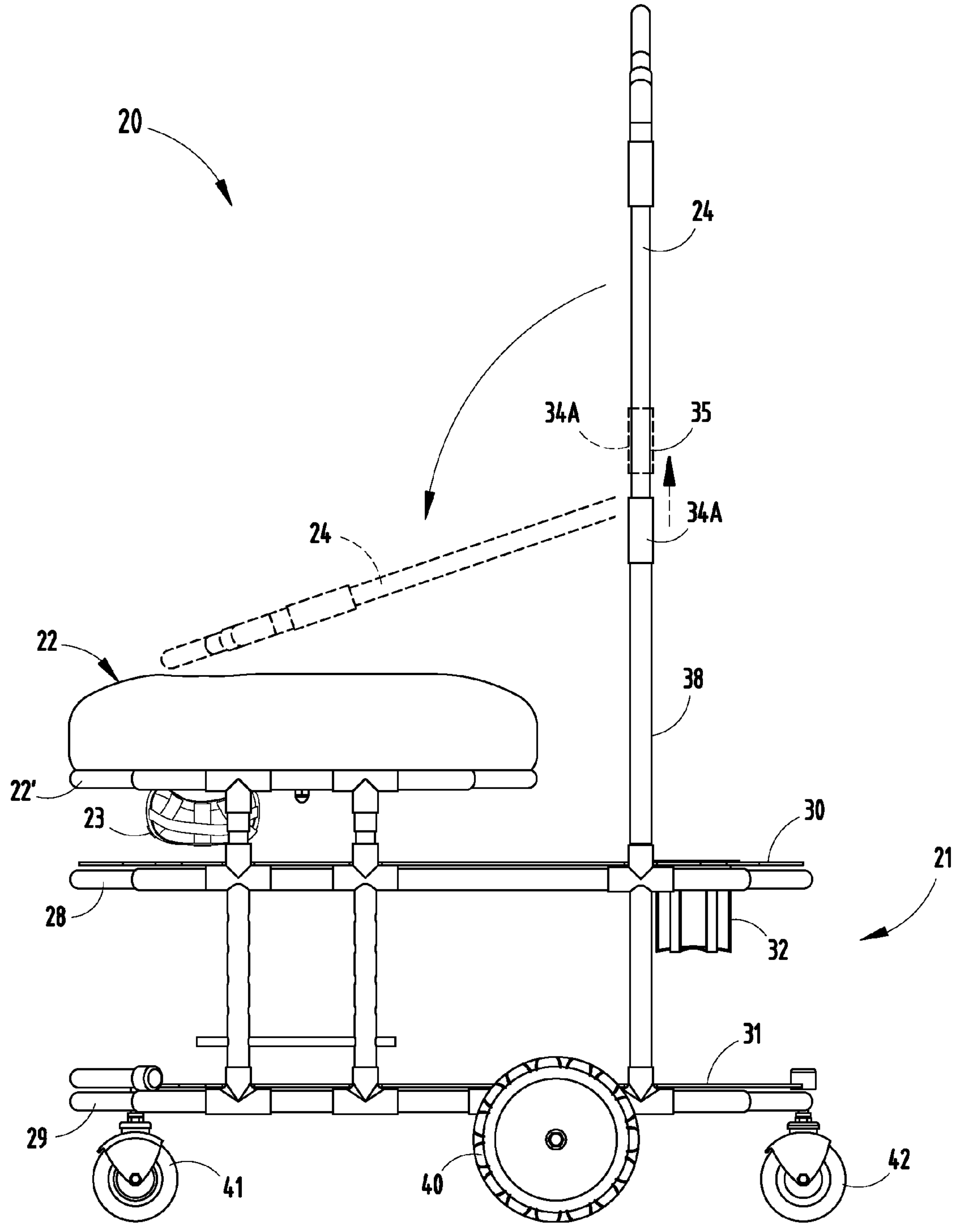
FIGS. 4-7 are side, side-cross-sectional, front and top views of FIG. 1.
Figure 5:
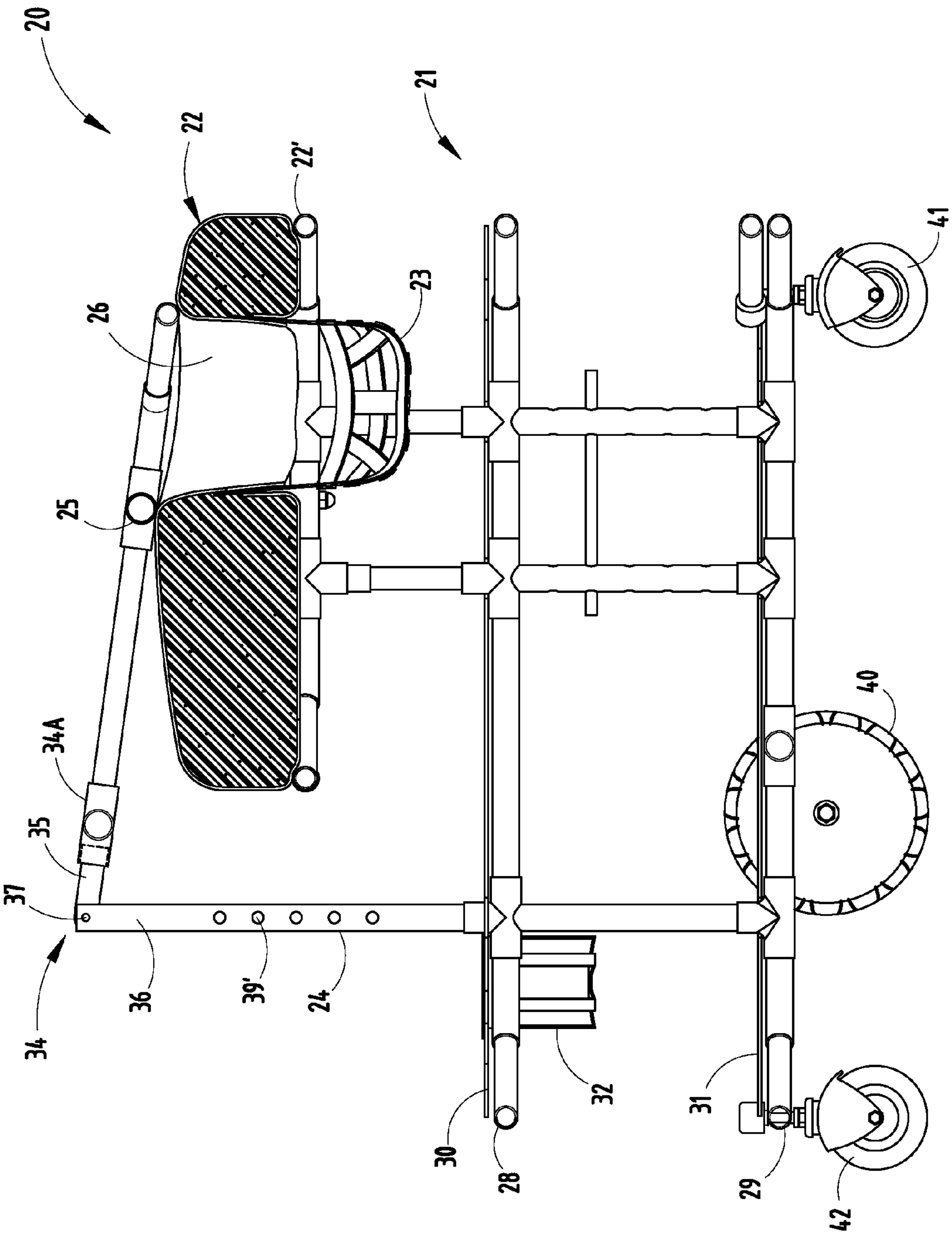
Figure 6:
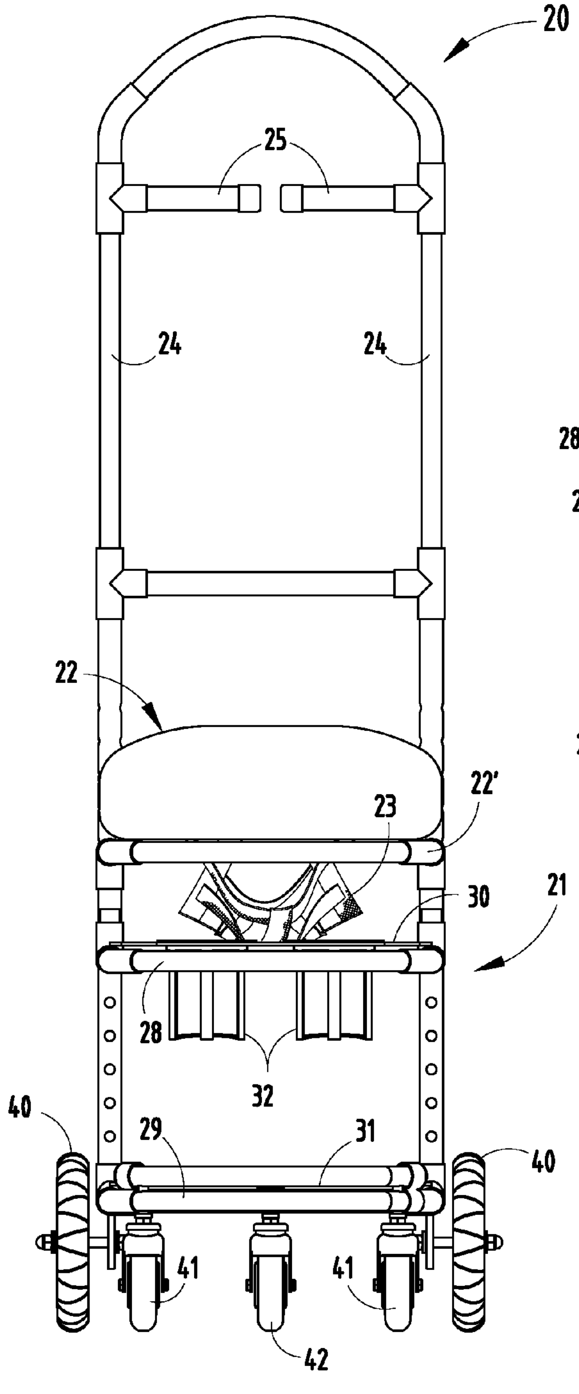
Figure 7:
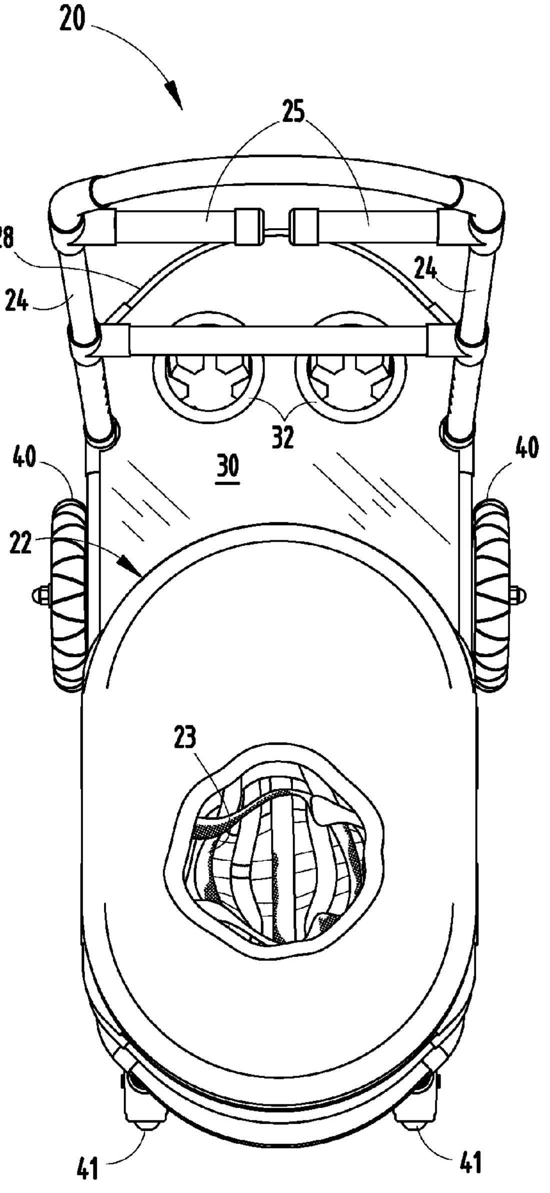

In one version of the present device, the frame 21 is made foldable by incorporating lockable joints 34 on each of the uprights 24 (see FIGS. 3B-3C). It is contemplated that different joints can be used for this purpose. The illustrated joint 34 includes upper and lower tube sections 35 and 36 that are pivoted together by pin 37. The illustrated joint 34 can be locked by sliding a Tee 34A downwardly over the joint 34, thus locking the tube sections 35 and 36 in a vertically aligned position. The illustrated Tee 34A supports a cross member, which has a similar Tee 34A on its other side. By grasping and lifting the cross member, the Tees 34A are lifted, releasing the joints 34 to be folded. The tube section 36 includes telescoping tube sections for height adjustment, and further includes a frictional detent 39 (FIG. 3B) for holding a selected height-adjusted position. The illustrated detent 39 is an internal spring detent with double-sided protrusions for selectively engaging one of the holes 39' in tube 36 when aligned (see FIG. 9) for holding a particular selected position.

The seat 22 is adjustably mounted on the frame 21. For example, the illustrated frame 22' of seat 22 includes vertically-telescoping tubes sections that can be vertically adjusted to different heights for long-legged or short-legged individuals, and further includes holes 51 and locking rods 52 for locking a selected seat height position. It is contemplated that different seat-adjustment mechanisms can be used. Further, the illustrated seat 22 can be removed from frame 21, rotated, and re-engaged to re-position the pocket/webbed basket in a rearward position to better form a front portion that is more adapted to be a comfortable "wheelchair type" seat. Handles 25 are adjustable so that an amputee can move himself or herself, or so that a helper can push the device as a wheelchair.

The wheeled frame 21 (FIG. 1) includes two fixed axle wheels 40 and two front-located steerable wheels 41 (i.e., a wheel that can be angularly adjusted around a vertical axle to re-oriented the wheel to roll in a different direction) at one end and one rear-located steerable wheel 42 located at an opposite end. The combination of these wheels provides significant stability to the device 20. In particular, it is noted that the front wheel 42 has a significant stabilizing effect when using the present device 20. Yet steerability of the device 20 is maintained, such that a user does not have to "fight" resistance of the wheels in order to turn and move in different directions.

Optional features include outriggers 44 that extend forward of the frame 21, such as 6-8", to locations for protecting a user's leg(s) . . . for use when using the device 20 as a wheelchair. The outriggers 44 also provide greater protection when a user is using the device 20 with their lower leg supported on the seat with their foot/ankle extending horizontally from the seat, such as when device 20 is being used by a person with a knee injury, or lower leg injury, and/or ankle or foot injury. The outriggers 44 are particularly useful to provide protection for the lower leg/ankle/foot of an injured user during a turn or cornering movement . . . such as when the user is changing direction to avoid an obstacle and hence is swinging their leg/ankle/foot past the obstacle. Notably, the device 20 can be stably used for forward movement with the upright 24 at a front of the device or at a rear of the device 20, and the outriggers 44 can be positioned at a front or rear as well.

Figure 10:
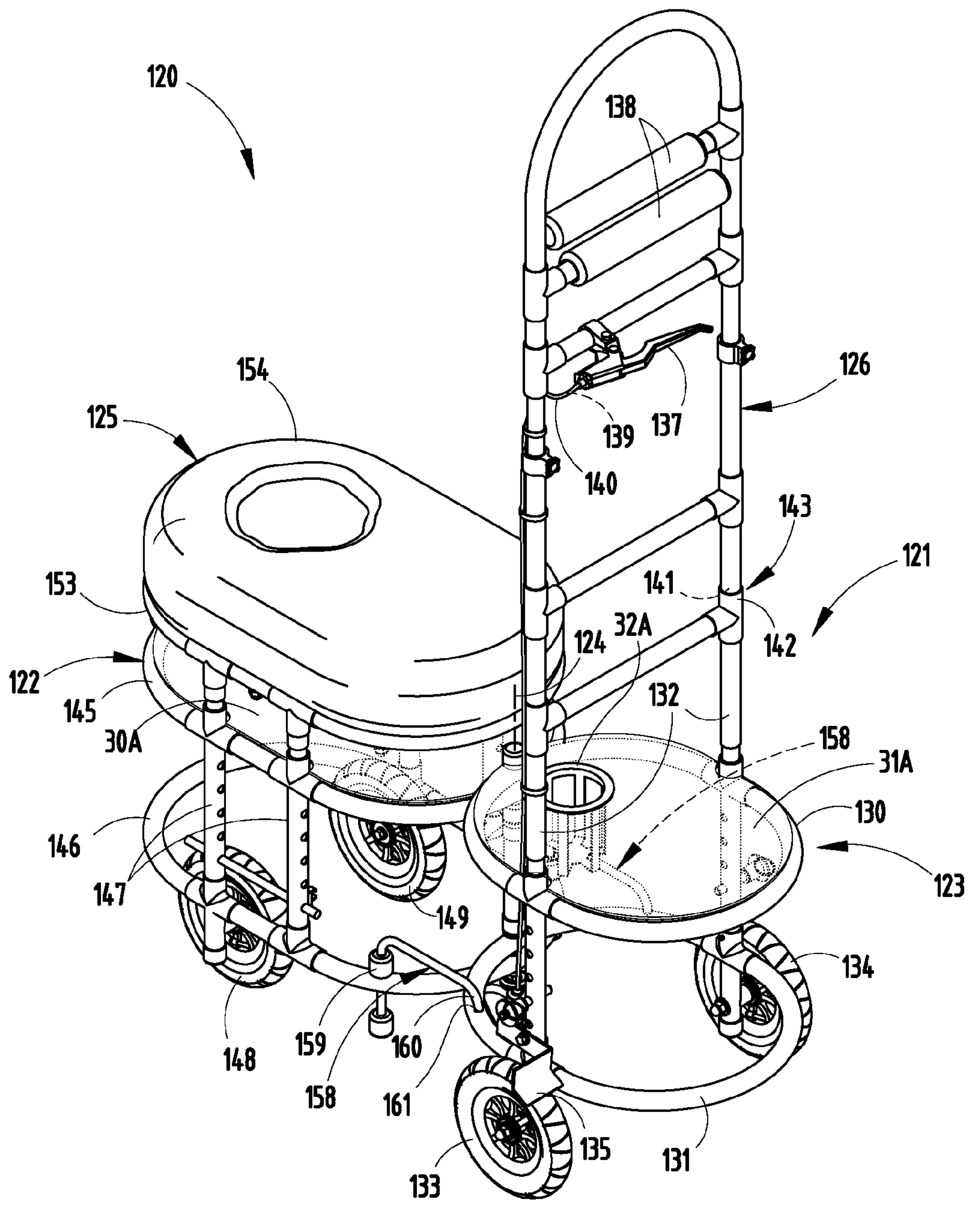

Optional features also include providing brakes on the device (see FIG. 1), such as a pair of cable-actuated wheel-locking hand brakes 45. (See also FIG. 10 below.) It is contemplated that the brakes can be made to frictionally engage only when grasp (e.g., like brakes on a two-wheel bicycle), or can be made lockable until manually released (e.g., brakes sometimes used on four-legged walkers). Also, it is contemplated that the wheels can be locked by foot-actuated wheel-mounted brakes that do not require cables. Cables (not specifically shown in FIG. 1) extend from the hand brakes 45 along tubular uprights 24 (on an inside or outside of the tubes) to a wheel-engaging braking lever for engaging the wheels 40 to stop their rotation. The wheel-engaging braking lever is not shown in FIG. 1, but see FIG. 10.

The illustrated device 20 is shaped and sized for use by an adult. However, another optional feature is to provide a smaller (sportier) junior version of the mobility device with a smaller footprint. It is contemplated that the vertical height adjustment options would be shorter, and geared toward shorter users (e.g., young adults or children). In the case of youth, the junior version could be made to be sporty, such as by providing different seat and frame colors, shapes, and sizes.

Figure 8:
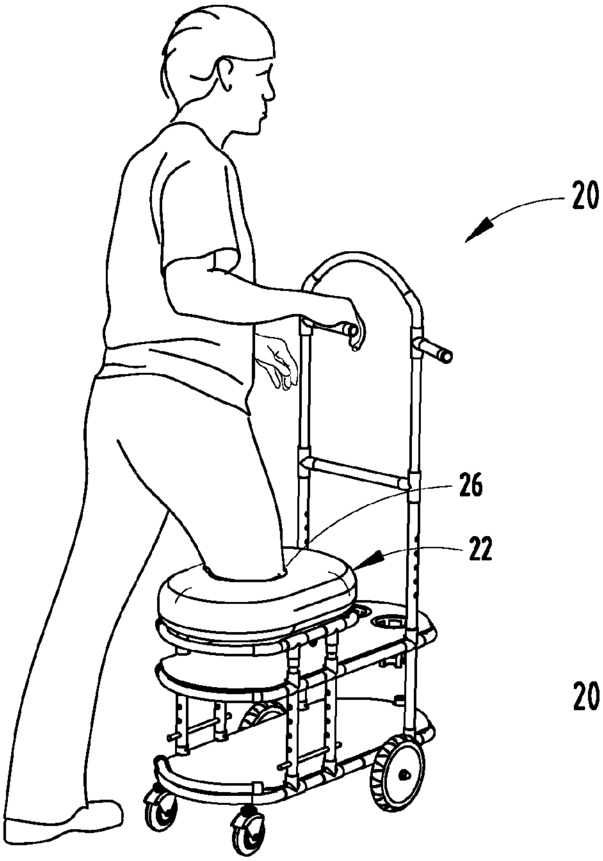
FIGS. 8-9 are perspective and side views of an amputee using the device of FIG. 1.
Figure 9:
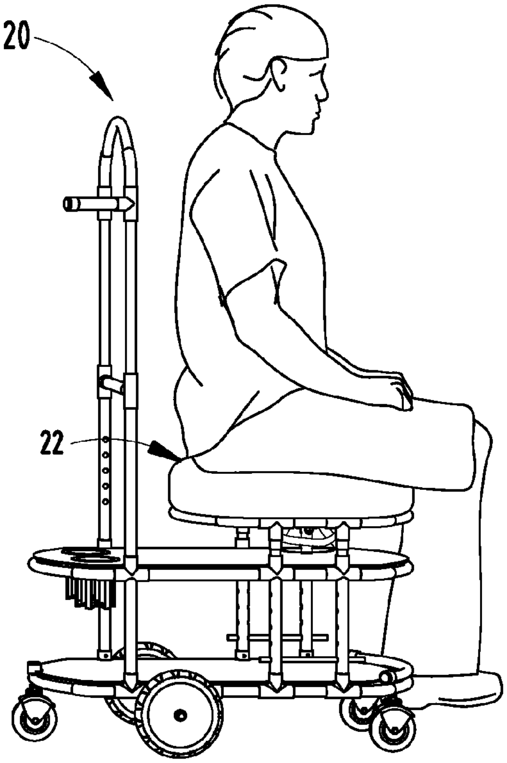

FIG. 8 illustrates an amputee using the device to "walk". FIG. 9 illustrates an amputee using the device as a wheel chair. It is also contemplated that a person with an injured leg (or ankle or foot) could place their knee and lower leg horizontally on the device 20 and "walk" in a manner similar to FIG. 8.

MODIFICATION

A wheeled mobility device 120 (FIG. 10) includes an articulating frame 121 with front and rear wheeled subframes 122 and 123 pivotally connected together at center pivot (see axis 124) for articulated cornering movement. Shelves 30A and 31A are supported on the subframes 122 and 123, respectively, along with a cup holder 32A. A cushioned structural seat 125 (with or without pocket for amputee's stump) is supported on the front subframe 122. An upright handle 126 is provided on the rear subframe 123 to give the user (and/or helper) greater control of steering movement of the first and second wheeled subframes 122 and 123.

Figure 11:
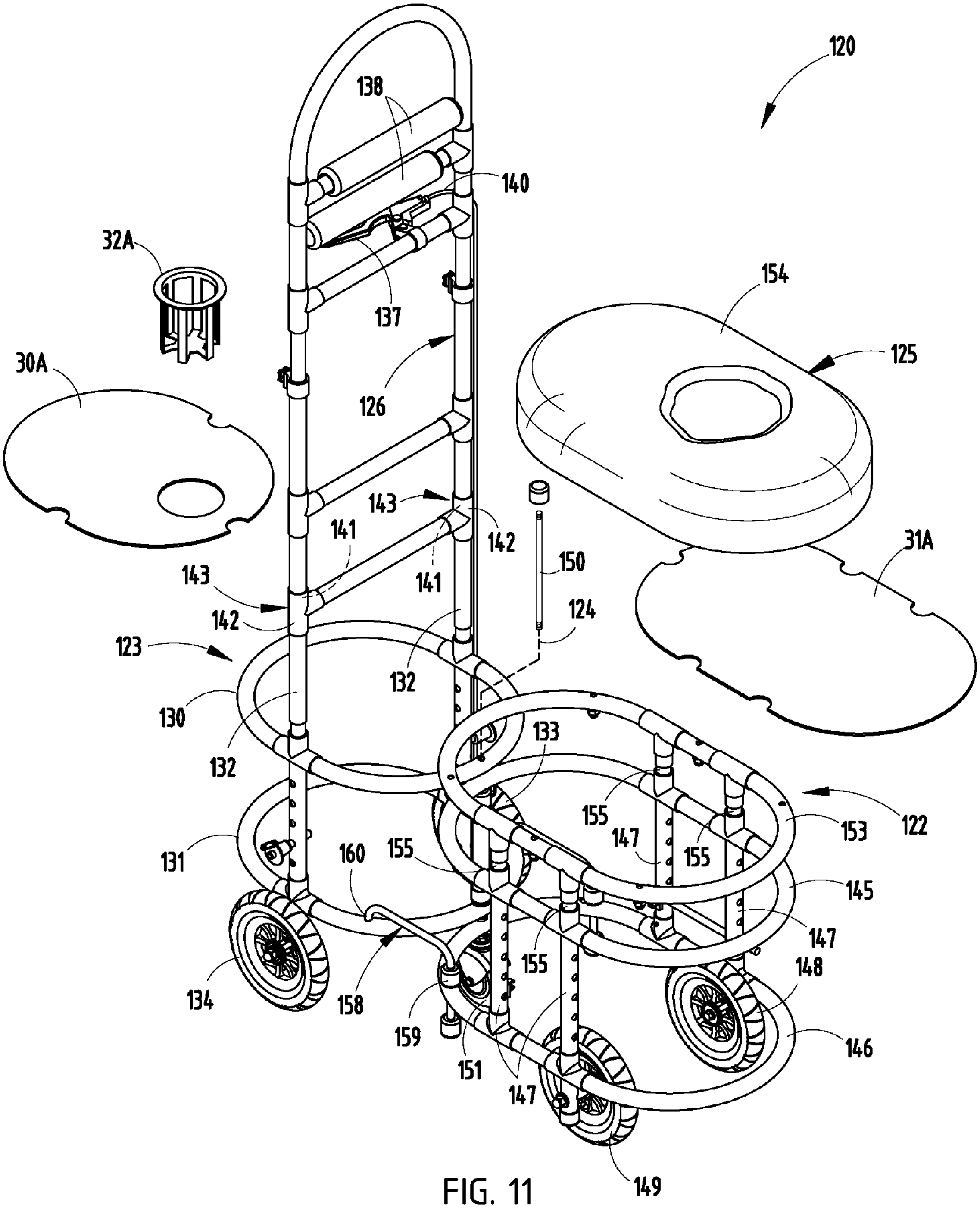
FIG. 11 is an exploded perspective view of FIG. 10.
Figure 12:
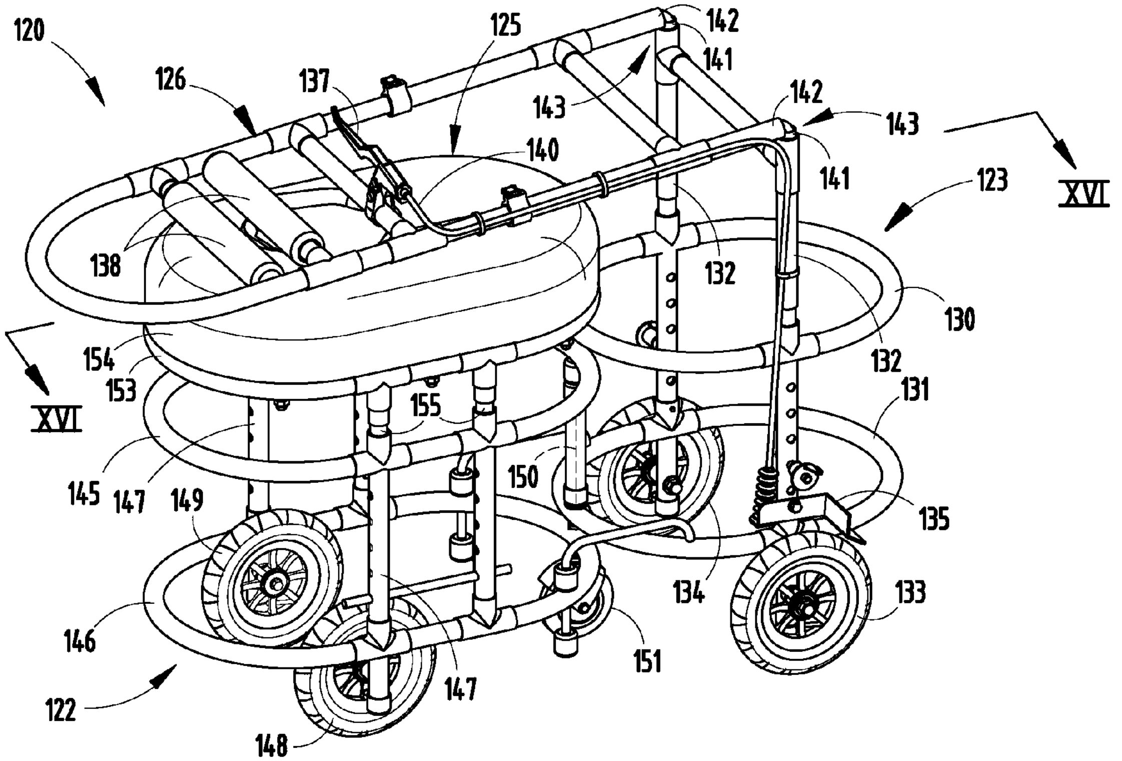
FIGS. 12-13 are perspective and side views of the device of FIG. 10.
Figure 13:
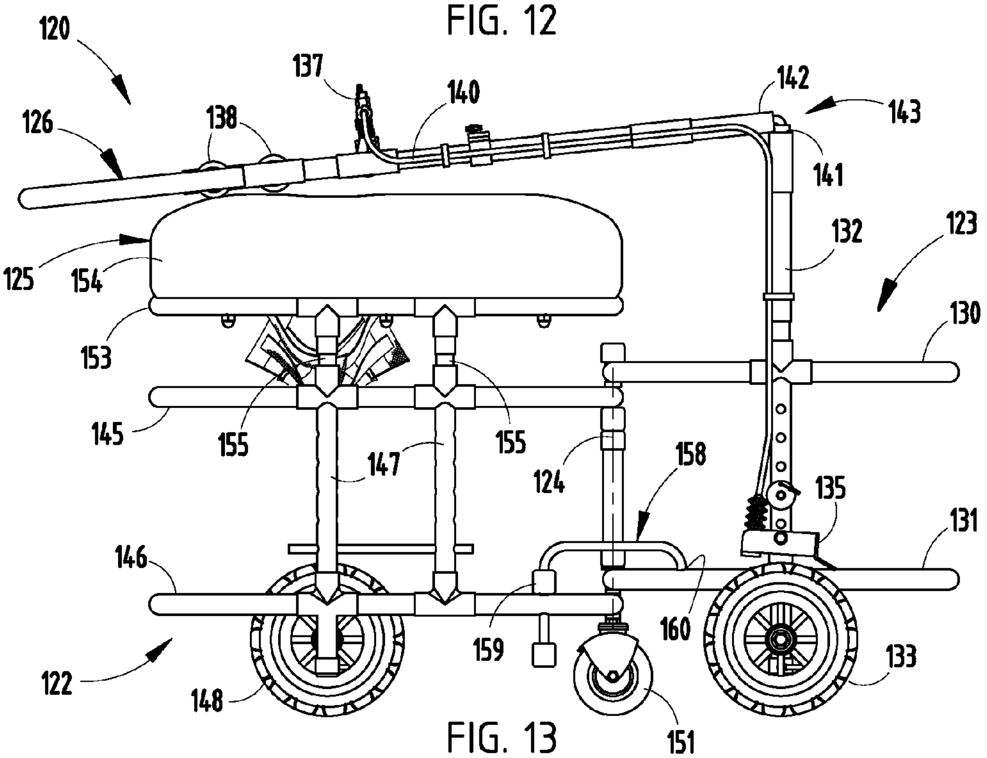
Figures 14, 14A:
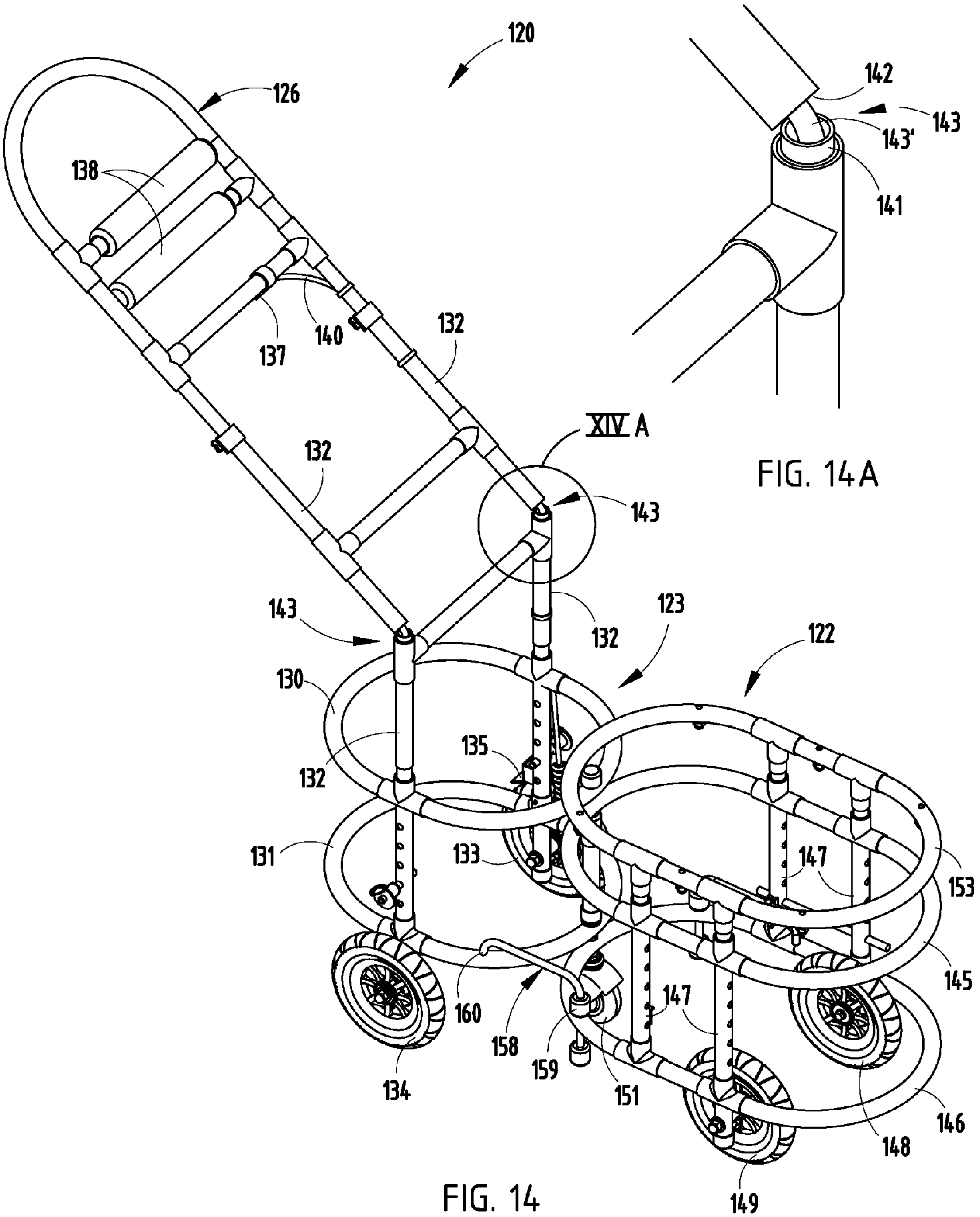
FIG. 14 is a perspective view of FIG. 13, but with the upright partially folded.
FIG. 14A is an enlarged view of the foldable joint.

The subframe 122 (FIG. 11) includes upper and lower loop-shaped sections 130 and 131 jointed by vertical tube sections 132 (which form a lower portion of the handle-supporting upright 126). Fixed-axle wheels 133 and 134 are attached to lower ends of the lower loop-shaped sections 131 or to a lower portion of the subframe 122 on outboard sides thereof. A lock bar 135 is also pivoted to a lower part of the subframe 122 ends adjacent the wheel 133. The lock bar 135 can be designed with a foot-operated tab for operating the lock bar 135 between a wheel-engaging locked position and a wheel-released unlocked position. Alternatively a locking lever 137 can be mounted on handle grip 138 and a cable 139 with sheath 140 routed along an outside of (or through an inside of) the upright 126 to the lock bar 135.

The illustrated device 120 includes a flexible wire-mesh-sleeve member 143' extended through the vertical tubes of the upright. Also, the upright 126 includes on each side a tubular tongue end 141 and socket end 142 on top and bottom portions of the upright at joint 143. This joint 143 can be pulled apart, allowing the upper portion of the upright to be laid down onto the seat 125 for compact storage, with the member 143' holding the tongue end 141 and socket end 142 together with a hinge-like connection (see FIGS. 12-14, 14A). When assembled (FIG. 10), the member 143' helps hold the joint 143 together along with gravity and the natural friction of the assembled ends 141/142. Also, the member 143' can protect the brake cable if the brake cable is routed internally through the upright.

The illustrated front subframe 122 is made entirely from linear or arcuate tubes (the arcuate tubes having a constant radius), "T" tube-connector members, and "X" tube-connector members. Joints can be fixed by known means, such as by adhesive, welding, or press fit. The illustrated tubular members of subframe 122 (and 123) are ¾" to ⅞" aluminum anodized and/or powder coated. It is contemplated that all tubes and structural members in the present subframes can be coated and/or painted and/or otherwise treated for aesthetics.

The rear subframe 123 includes upper and lower loop-shaped sections 145 and 146 jointed by vertical tube sections 147. Steerable wheels 148 and 149 (i.e., wheels rotatable about a vertical axis for directional control) are attached to lower/front ends of the lower loop-shaped section 146 on outboard sides thereof. The center pivot defining axis 124 is formed by a vertical pin 150 that extends through an overlapped portion of subframe loop-shaped sections 130/131 and through an overlapped portion of subframe loop-shaped sections 145/146. A spacer tube can be positioned around the vertical pin 150 between the sections 130/131 and 145/146 to better maintain vertical spacing of the upper and lower loop-shaped sections if desired. A steerable wheel 151 supports a bottom of the pin 150 under axis 124 and directly supports any weight on the center pivot. Notably, the wheels 149 under the front subframe 122 are located on an inside of the subframe so that a user does not strike the wheels 149 when using the device 120 to walk. It is noted that any or all of the wheels can be located inside (or outside) of the footprint of the subframes 122/123 if desired, and further that additional wheels can be added (such as a steerable sixth wheel at a center/rear of the device).

The seat 125 (also called a "cushioned support member" or a "horizontal structural support") includes a tubular loop-shaped under-frame 153 supporting a cushioned upholstered top member 154. Vertical tubular sections 155 extend downward from the under-frame 153 and telescopingly into vertical tube sections 147. The vertical tubular sections 155 include a spring-biased projection that engages a selected one of the holes in the vertical tube sections 147 for selective seat height adjustment.

As will be understood by persons skilled in this art, like the device 20, the device 120 includes horizontally rotatable hand grips 138, foldable upright 126, wheel locks, cup holders, storage shelves, and other features and characteristics as described in regard to device 20. A repetitive description is thus not necessary.

It is noted that the fixed-axle wheels 133/134 are located sufficiently inboard so that a user does not tend to strike them with a foot when using the device 120. In particular, the wheels 133/134 (and the other wheels) can be located on inboard or outboard sides of the frame portion to which they are mounted, or the frame itself can be made sufficiently small relative to the upright 126 and other features of the device 120 so that the wheels can be located outside the subframe while still being in a position where they will not interfere with a user taking steps (i.e., "walking").

Figure 15:
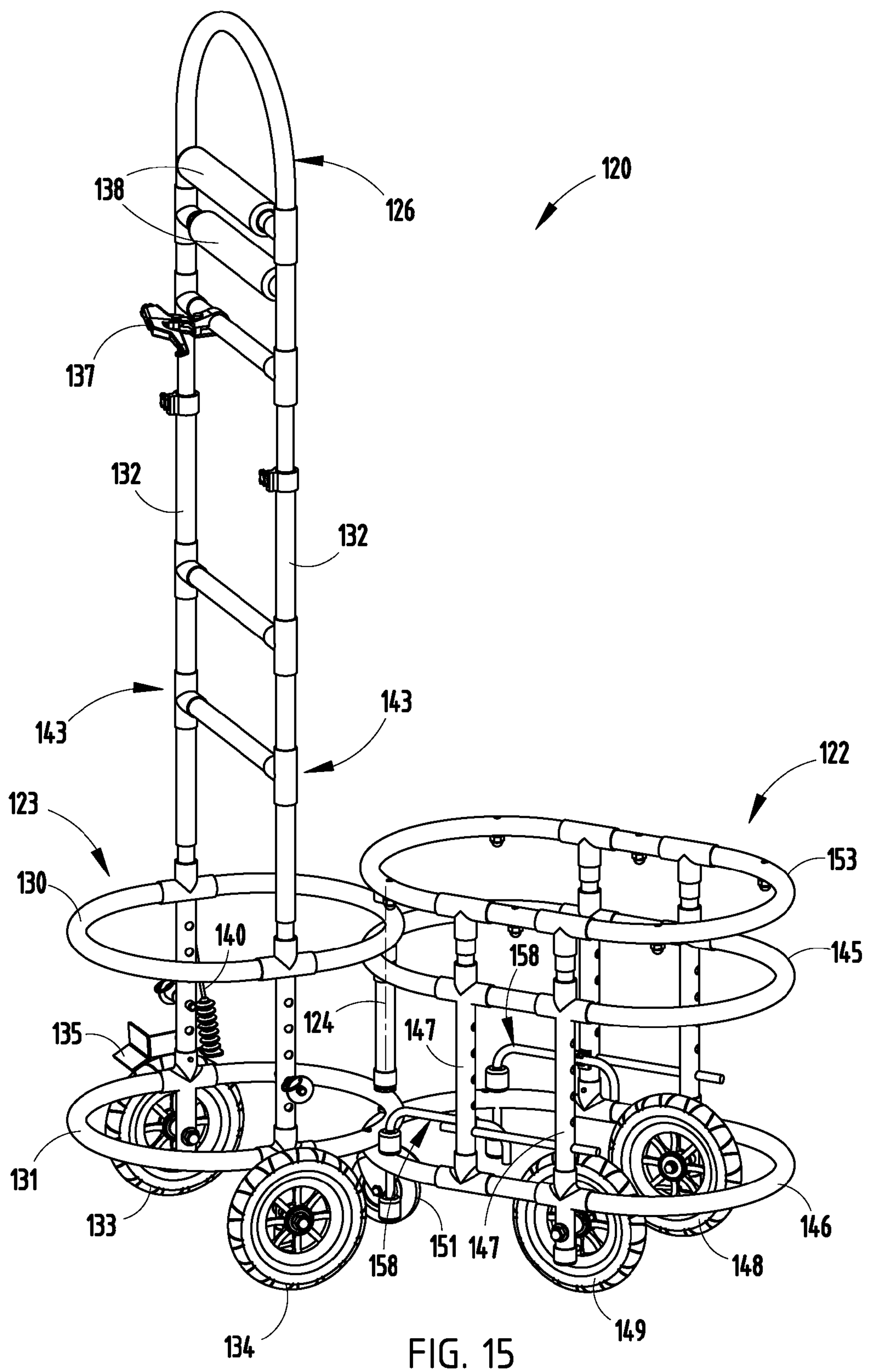
FIG. 15 is a perspective side view showing the device in a cornering/angled position.
Figure 16:
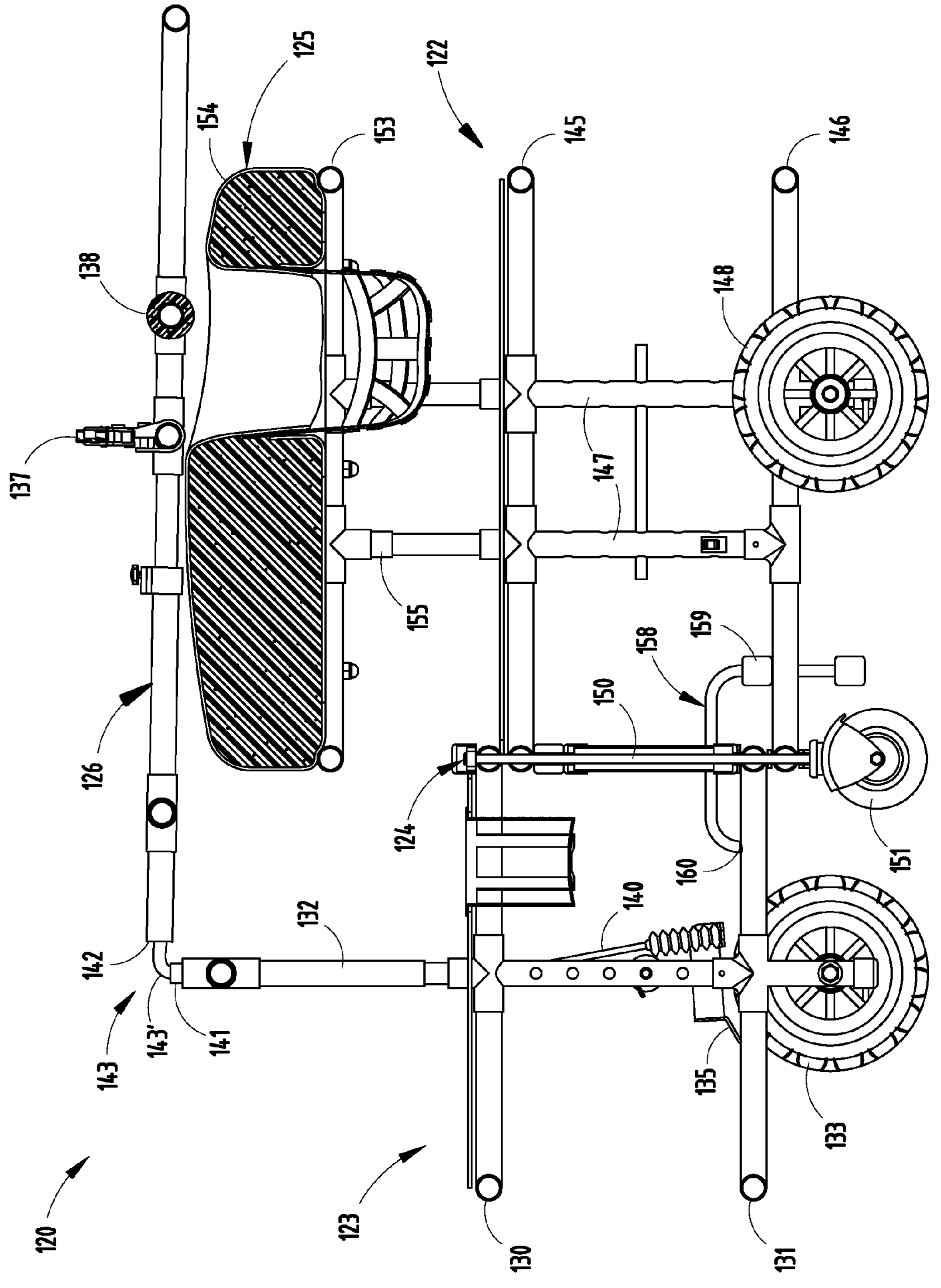
FIG. 16 is a side cross-sectional view showing the device of FIG. 11.
Figure 17:
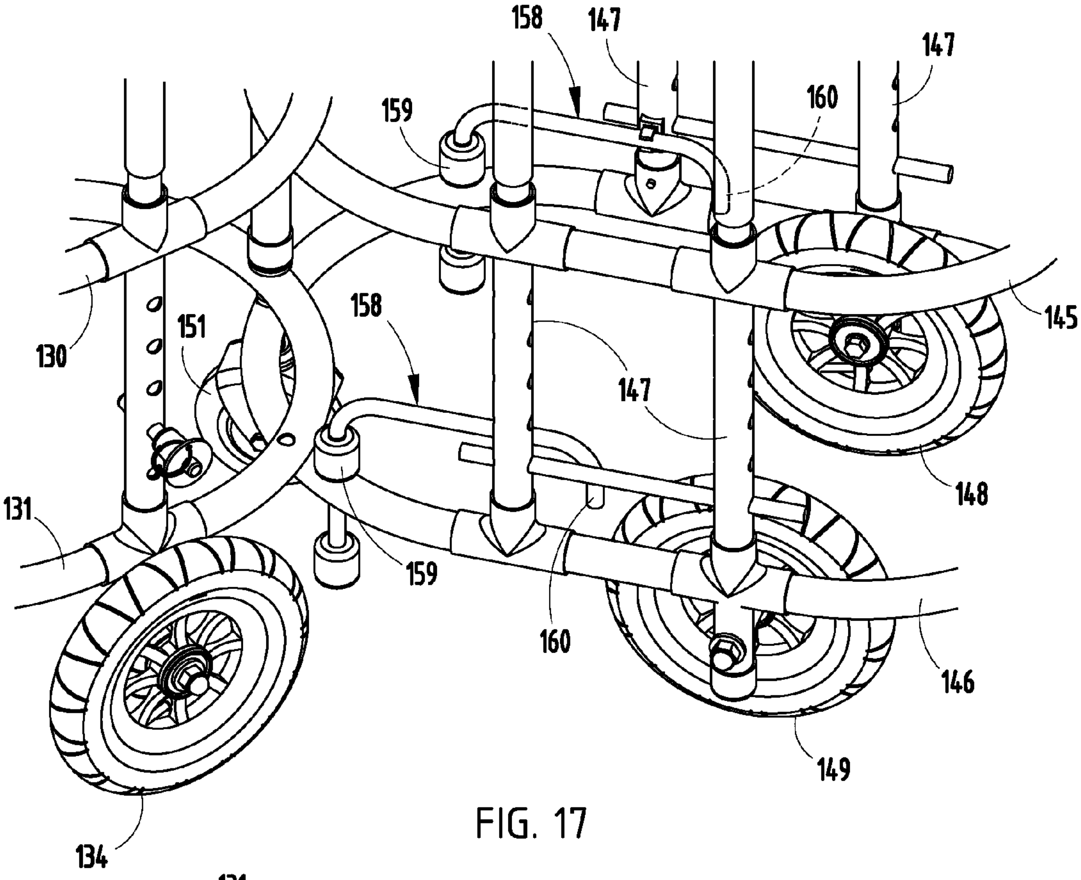
FIG. 17 is a fragmentary perspective view of FIG. 11 showing the center pivot and pivot-limiting structure.
Figure 18:
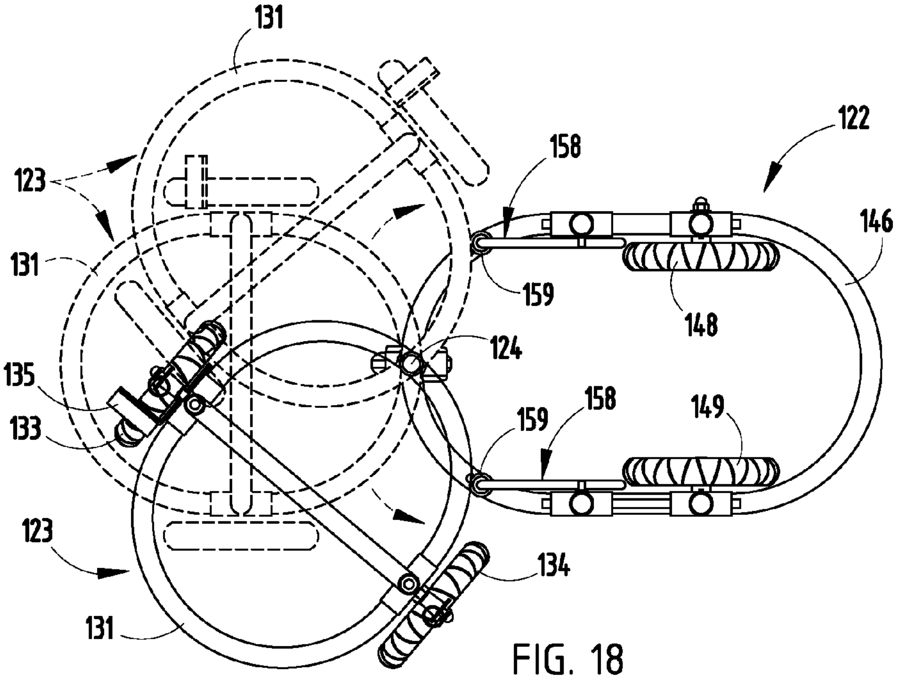
FIG. 18 is a top view illustrating cornering/angled positions of the device.

An articulation stop member 159 (on one or both sides) (FIG. 15) is attached to one of the subframes 122 and/or 123 and forms an abutment so that the member 159 abuttingly engages the other subframe 122/123 when the articulating frame 121 is articulated to a maximum (or minimum) angle. Also, a link 158 (FIG. 14) is pivoted at stop member 159 and includes a hooked end 160 that can be positioned a hole in the subframe 123, thus preventing the articulating frame 121 from any articulating movement.

Figure 19:
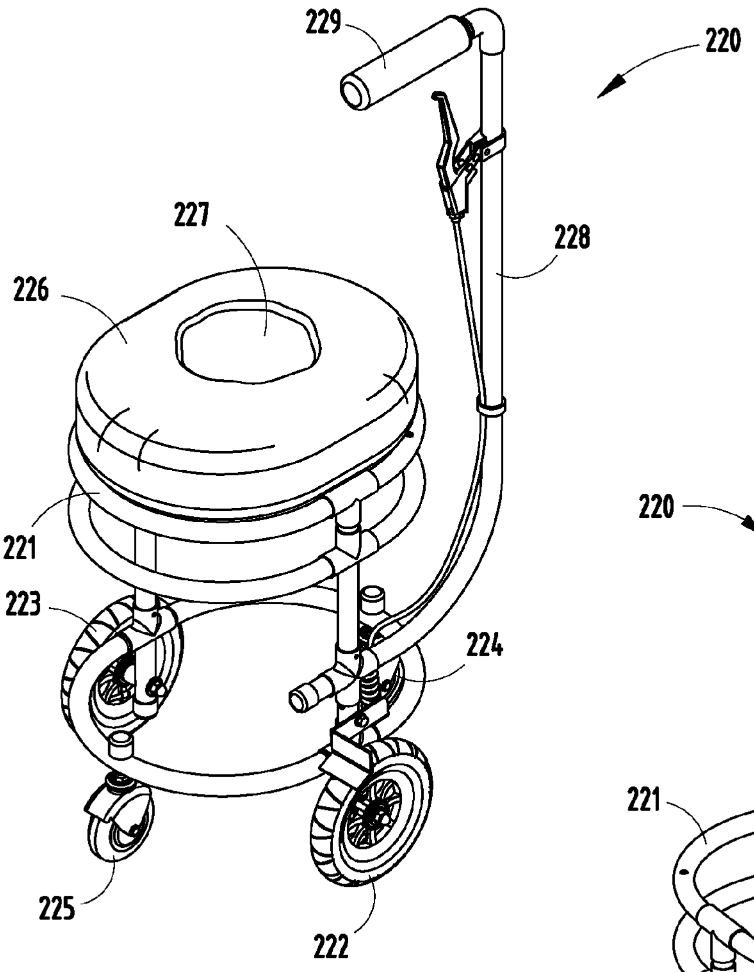
FIGS. 19-19A are front and rear perspective views of a second modified mobility device having a solid wheeled frame, a seat having a pocket for receiving an amputee's leg, and an upright handle to assist in use.
Figure 19A:
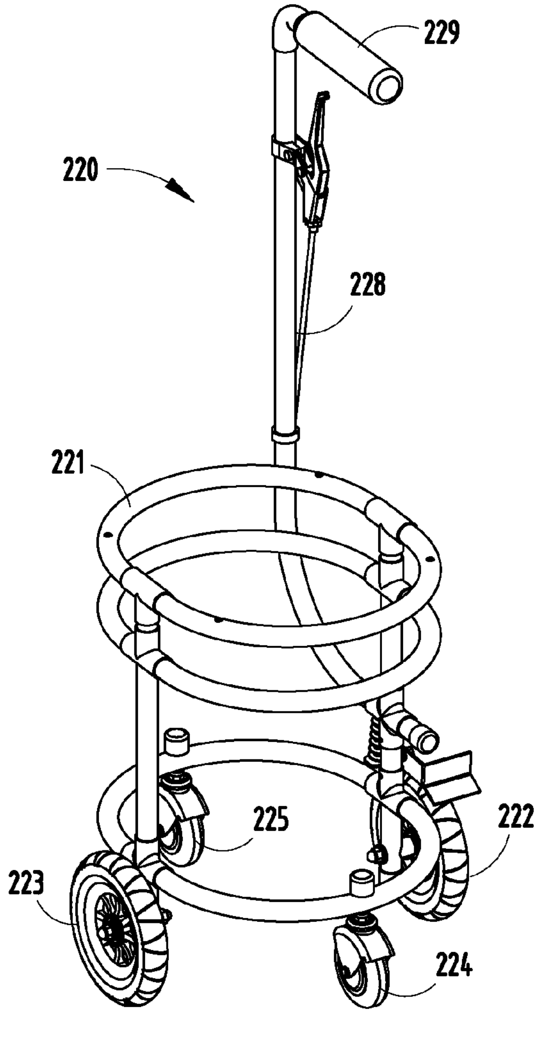

Another modified mobility device 220 (FIGS. 19-19A) includes a multi-loop frame 221 (or single loop frame if there is no seat) having opposing fixed-axle wheels 222 and 223 and opposing (front and rear) steerable wheels 224 and 225 arranged around sides of the frame 221. The frame 221 can be any size, but preferably it has sufficient horizontal dimensions to place the four spaced wheels 222-225 apart for stable operation, such as about 12" to 15". These dimensions can be changed depending on a size and age of the user, and the user's skill in operating a wheeled transport device. A horizontal structural seat member 226 is supported on the frame (with or without a pocket 227 adapted to receive and support an amputated leg of a user). A single-tube handled upright 228 extends up from the frame 221 and includes a handle 229 adapted for grasping by the user to facilitate use of the mobility device 220. One such handled upright is illustrated on a "right" side of the frame 221 in FIG. 19, where the handled upright 228 includes a vertical tube section, a lower fore-aft horizontal tube section at its bottom extending forward to a connection to the frame 221, and an upper fore-aft horizontal tube section at its top extending over the frame 221 to form a handle. A hand brake can be operably attached to the handled upright if desired, as illustrated. (See the hand brake in FIG. 10.)

It is contemplated that a wide number of variations in size, optional features, adjustability, and accessories can be made in the devices 20, 120, and 220. For example, variations in color and shape will be made to make the unit sportier for younger individuals, while older users may prefer simplicity and easy/stable/non-adjustable operation. It is also contemplated that at least the devices 20 and 120 can be used as carts or wagons or wheelchairs for transporting personal items along with a user. The articulating device 120 is particularly adapted to transport items through buildings with hallways, narrow corners, and narrow-width passageway-forming walls/obstacles.

It is contemplated that the present devices can be used by a wide variety of persons, including not only an amputee, but also persons with a leg injury, a knee injury, an ankle injury, a foot injury, rheumatism, age-related issues, poor balance, as well as to help people with other health and non-health issues. Notably, the present devices can modified to accommodate special needs of such patients. For example, the handled upright can be modified so that a person who needs to hold their leg straight can extend their leg through (between) the uprights while riding on the mobility device. (This arrangement also protects the leg from being hit.) A further advantage is that the present device allows (causes) a patient to use physical effort to move, which has health and recovery benefits. Instead of using crutches, the patient moves vertically (which helps the patient regain balance, improve muscle mass for walking, and build stamina). This is done without (or in combination with) a prosthesis, crutch or helper. This further has the advantage of providing a mental boost to patients by providing increased independence, and further allows patients to look at others "in the eye" (rather than having to look up, which can be demoralizing to the patients).

It is contemplated that the present frame can be mounted on different mechanisms for going across different terrains and landscapes. For example, the present support with pocket can be mounted on a snow-board or ski. Also, the wheels can be enlarged or made "bulbous" so that the present device can be moved along a sandy or irregular surface.

It is contemplated that the present designs illustrated herein are also novel, ornamental, and unobvious to consumers and skilled artisans in this art. In particular, the present devices are not as institutional-appearing in style, including their entirety and components.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A mobility device comprising:

an articulating frame including front and rear wheeled subframes pivotally connected together for articulated cornering movement; and a cushioned support member including a cushion defining a vertically-open pocket configured to stably receive and engage the amputee's stump, and including a basket under the pocket, the basket being formed by flexible members with openings therebetween for air and that are adjustable for adjusting a size of the basket for comfort, the cushion and basket being adapted to support a user on at least one of the first and second wheeled subframes.

2. The mobility device defined in claim 1, wherein the wheeled subframes defines a center pivot and includes wheels, at least one of the wheels being located under the center pivot of the articulated frame.

3. The mobility device defined in claim 1, wherein the front and rear wheeled subframes include tubular sections forming closed loops when viewed from above.

4. The mobility device defined in claim 1, wherein support member includes a cushion with an upper surface forming a contoured seat.

5. The mobility device defined in claim 1, wherein the support is removable and reversible to at least one second position on the frame.

6. The mobility device defined in claim 1, wherein the support forms a seat extending forward of a center pivot on the frame, such that the device can be used as a wheelchair.

7. The mobility device defined in claim 1, wherein the wheeled frame includes at least one fixed-axle wheel and at least one steerable wheel.

8. The mobility device defined in claim 7, wherein the at least one fixed-axle wheel includes at least two fixed-axle wheels, and wherein the at least one steerable wheel includes at least two steerable wheels.

9. The mobility device defined in claim 1, wherein the wheeled frame includes at least three steerable wheels, and at least one fixed-axle wheel.

10. The mobility device defined in claim 1, wherein the wheeled frame includes protruding outriggers extending beyond the support member for protecting a user's legs when extended beyond the support.

11. The mobility device defined in claim 1, wherein the wheeled frame includes uprights with handles extending above the wheeled frame.

12. The mobility device defined in claim 11, wherein the handles are rotatable on the uprights.

13. The mobility device defined in claim 1, including at least one shelf on the wheeled frame.

14. The mobility device defined in claim 13, wherein the at least one shelf includes two shelves spaced vertically.

15. The mobility device defined in claim 1, wherein the wheeled frame includes a cup holder.

16. The mobility device defined in claim 1, including a handled upright extending vertically from the wheeled frame when in an upright use position, the upright being foldable to define a smaller vertical dimension than when in the upright use position for compact storage.

17. The mobility device defined in claim 1, including on the wheeled frame a hand brake.

18. An amputee mobility device comprising:

a wheeled frame; and a support member supported on the wheeled frame including a cushion that defines a vertically-open pocket and including a basket under the pocket suitable for vertically directly receiving and stably engaging a stump of an amputee's leg, the basket being formed by overlapping flexible members defining side and bottom openings, the wheeled frame and basket being constructed to support an amputee moving across a level surface with a walking motion.

19. The mobility device defined in claim 18, wherein the wheeled frame includes a plurality of wheels, at least one of the wheels being located under a center pivot of the wheeled frame.

20. The mobility device defined in claim 18, wherein the wheeled frame includes front and rear wheeled subframes including tubular sections forming closed loops when viewed from above.

21. The mobility device defined in claim 18, wherein the pocket includes an adjustment mechanism for adjusting the pocket's size for comfort.

22. The mobility device defined in claim 18, wherein the support member forms a seat extending forward of a center pivot on the frame, such that the device can be used as a wheelchair.

23. The mobility device defined in claim 18, wherein the wheeled frame includes at least one fixed-axle wheel and at least one steerable wheel.

24. The mobility device defined in claim 23, wherein the at least one fixed-axle wheel includes at least two fixed-axle wheels, and wherein the at least one steerable wheel includes at least two steerable wheels.

25. The mobility device defined in claim 18, wherein the wheeled frame includes five wheels including at least three steerable wheels and at least one fixed-axle wheel.

26. The mobility device defined in claim 18, including at least one shelf on the wheeled frame.

27. The mobility device defined in claim 26, wherein the at least one shelf includes two shelves spaced vertically.

28. The mobility device defined in claim 18, including a handled upright extending vertically from the wheeled frame when in an upright use position, the upright being foldable to define a smaller vertical dimension than when in the upright use position for compact storage.

29. The mobility device defined in claim 18, including on the wheeled frame a hand brake.

* * * * *